(12) United States Patent
Varteresian et al.

(10) Patent No.: US 12,375,492 B2
(45) Date of Patent: Jul. 29, 2025

(54) ROLE-BASED ACCESS CONTROL FOR CLOUD FEATURES

(71) Applicant: Dell Products L.P., Round Rock, TX (US)

(72) Inventors: Michael G. Varteresian, Lexington, MA (US); Muzhar S. Khokhar, Shrewsbury, MA (US); Wenfeng Li, Shanghai (CN); Donald Mace, Mashpee, MA (US)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 17/584,945

(22) Filed: Jan. 26, 2022

(65) Prior Publication Data

US 2023/0239302 A1 Jul. 27, 2023

(51) Int. Cl.
*H04L 9/40* (2022.01)
(52) U.S. Cl.
CPC .................................. *H04L 63/102* (2013.01)
(58) Field of Classification Search
CPC ............................ H04L 63/102; H04L 63/083
See application file for complete search history.

(56) References Cited

U.S. PATENT DOCUMENTS

| | | | |
|---|---|---|---|
| 11,134,085 B2* | 9/2021 | Wuest | H04L 63/20 |
| 2014/0282889 A1* | 9/2014 | Ishaya | H04L 63/10 |
| | | | 726/4 |
| 2020/0151024 A1* | 5/2020 | Ji | G06F 9/546 |
| 2020/0286315 A1* | 9/2020 | Mehrotra | G07C 9/00896 |
| 2022/0245621 A1* | 8/2022 | Yang | G06Q 10/0833 |
| 2022/0350930 A1* | 11/2022 | Dambal | G06F 21/80 |

* cited by examiner

*Primary Examiner* — SM A Rahman
(74) *Attorney, Agent, or Firm* — Jackson Walker L.L.P.

(57) ABSTRACT

An information handling system may include at least one processor and a memory. The information handling system may be configured to: receive, from a cloud management portal, a request to execute a management task, wherein the request includes information regarding a cloud identity associated with the request; determine a local identity that corresponds to the cloud identity; determine whether the local identity has sufficient privileges to execute the management task; and in response to a determination that the local identity does have sufficient privileges to execute the management task, cause the management task to be executed.

15 Claims, 2 Drawing Sheets

ROLE-BASED ACCESS CONTROL FOR CLOUD FEATURES

TECHNICAL FIELD

The present disclosure relates in general to information handling systems, and more particularly to providing secure access to cloud-based management tools.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), customers sometimes use cloud-based management tools to manage their information handling systems. For example, for a Dell EMC VxRail™ HCI system, a cloud-based management tool known as Analytical Consulting Engine (ACE) or MyVxRail is one such solution. In one embodiment, a customer administrator may access a management web page hosted by an HCI manufacturer, and cloud-based tools may then provide management functionality of the customer's assets. A cloud-based management tool may also be referred to herein as a cloud management portal.

For example, an administrator may initiate some operation (e.g., a software or firmware upgrade or downgrade, a configuration change, etc.) from a web browser coupled to a website of a cloud system, and the cloud system may then distribute commands associated with the operation to the affected edge devices. The web browser may be running on a computer (e.g., a laptop) that has access to the data center's local network (on-premises) or does not have access to the local network (off-premises).

In some instances, the permissions that are required to perform actions that change the configuration of a system through a cloud management portal may be associated with the customer's identity in the cloud domain. That is, the customer may use the cloud system itself and/or a third-party authentication system instead of the local on-premises authentication system in order to grant or deny permissions to perform cloud actions like updating a cluster, changing configurations, etc.

This may increase the customer's cognitive load when managing permissions, and it may also pose security risks because the cloud domain permissions are typically not automatically updated when the customer's on-premises permissions (e.g., Active Directory, LDAP, Kerberos, vCenter, etc.) are changed or when a user account is removed, etc. A typical solution involves storing customer on-premises credentials in the cloud, so that commands initiated in the cloud can access the on-premises systems with those credentials. However, this poses a security risk for both the customer and the cloud provider by storing sensitive customer information in the cloud application.

Accordingly, embodiments of this disclosure may provide methods for leveraging the on-premises customer permissions system in the cloud, but without transferring sensitive customer account information to the cloud.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with cloud-based management may be reduced or eliminated.

In accordance with embodiments of the present disclosure, an information handling system may include at least one processor and a memory. The information handling system may be configured to: receive, from a cloud management portal, a request to execute a management task, wherein the request includes information regarding a cloud identity associated with the request; determine a local identity that corresponds to the cloud identity; determine whether the local identity has sufficient privileges to execute the management task; and in response to a determination that the local identity does have sufficient privileges to execute the management task, cause the management task to be executed.

In accordance with these and other embodiments of the present disclosure, a method may include an information handling system receiving, from a cloud management portal, a request to execute a management task, wherein the request includes information regarding a cloud identity associated with the request; determining a local identity that corresponds to the cloud identity; determining whether the local identity has sufficient privileges to execute the management task; and in response to a determination that the local identity does have sufficient privileges to execute the management task, causing the management task to be executed.

In accordance with these and other embodiments of the present disclosure, an article of manufacture may include a non-transitory, computer-readable medium having computer-executable instructions thereon that are executable by a processor of an information handling system for: receiving, from a cloud management portal, a request to execute a management task, wherein the request includes information regarding a cloud identity associated with the request; determining a local identity that corresponds to the cloud identity; determining whether the local identity has sufficient privileges to execute the management task; and in response to a determination that the local identity does have sufficient privileges to execute the management task, causing the management task to be executed.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
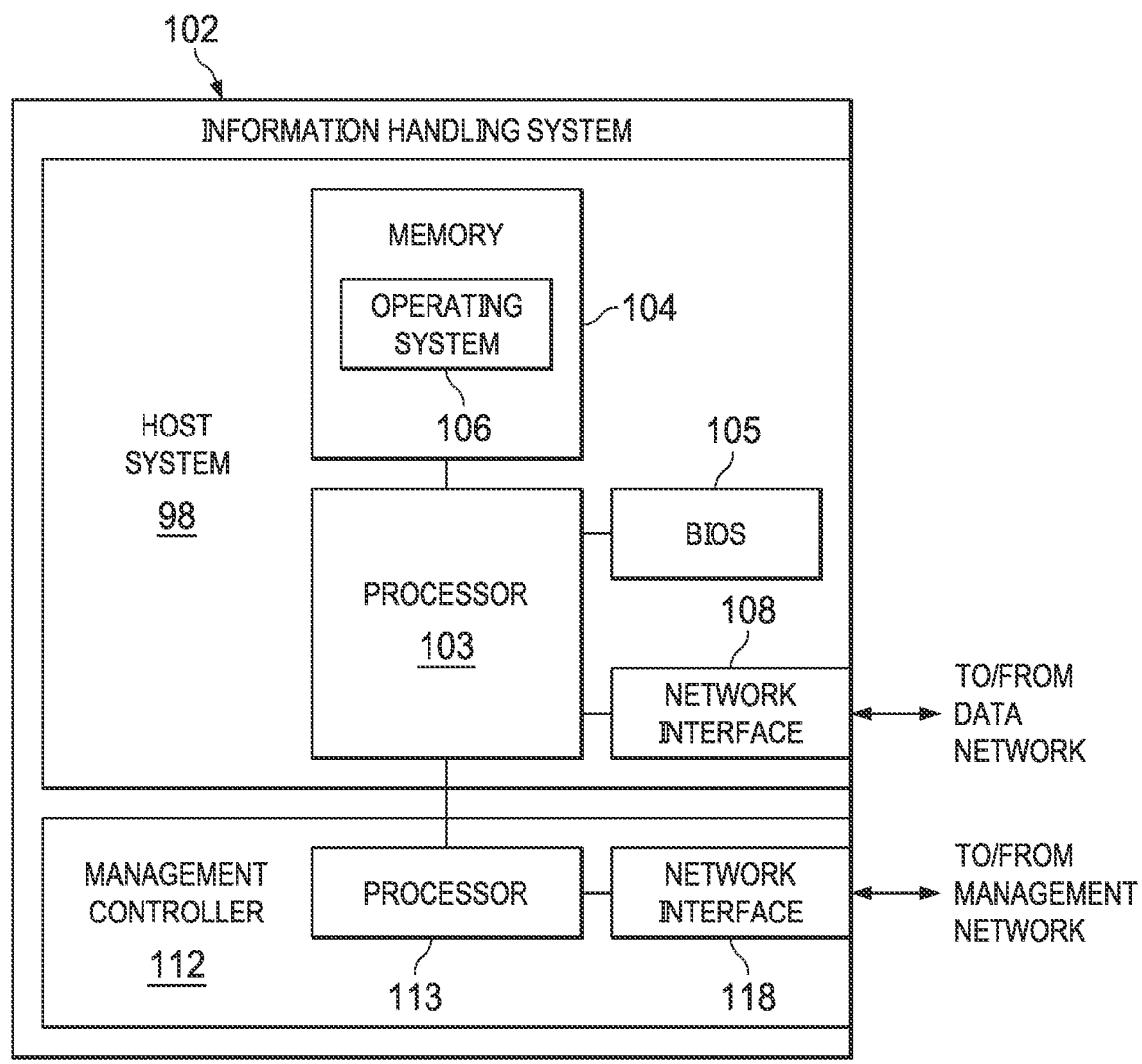
FIG. 1 illustrates a block diagram of an example information handling system, in accordance with embodiments of the present disclosure.
Figure 2:
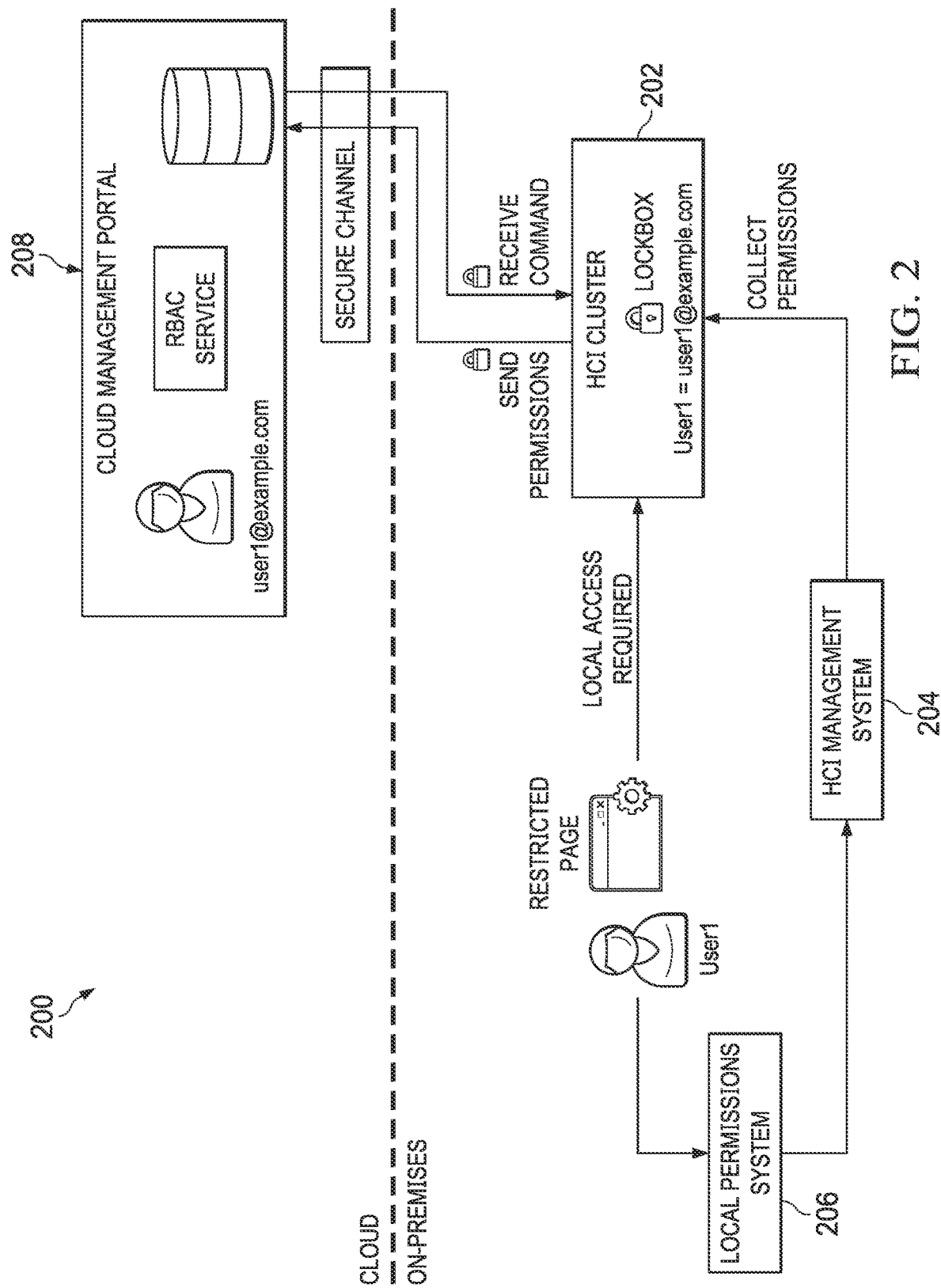
FIG. 2 illustrates a block diagram of an example information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may provide methods for leveraging an on-premises security model and permissions system in the cloud, but without transferring sensitive customer account information to the cloud. One embodiment may achieve this by mapping the on-premises customer account identities to the cloud identities, such that the sensitive information (e.g., the local account information such as usernames and passwords) is stored only locally (e.g., on-premises). Thus access controls may be applied to cloud identities based on roles that are assigned to their corresponding local identities, but without disclosing sensitive information for storage in the cloud.

The mapping information may be stored both on the local systems (e.g., at each HCI cluster) and in the cloud in one embodiment. In other embodiments, the mapping information need not be sent to the cloud, and the cloud may have access only to the customer's cloud identity, with the mapping verified locally.

In one embodiment, the mapping may be one-to-one, such that each local identity corresponds to exactly one cloud identity. This may aid in auditing tasks by allowing verification of which identity requested specific operations.

When a management operation is initiated in the cloud management system, instructions for carrying out the operation may be sent to the HCI cluster, along with an identifier for the specific cloud identity that requested the operation. The cluster may then access the locally stored mapping information to verify, at the time of execution, that the cloud identity corresponds to a local account identity that has appropriate permissions for carrying out the task in question.

Turning now to FIG. 2, an example system 200 is shown for enabling role-based access control for cloud management features.

As shown, an on-premises HCI management system 204 may be used to manage one or more HCI clusters 202. Cloud management portal 208 may allow an administrator to initiate management tasks via a web portal. As discussed below, role-based access controls may be implemented via an RBAC service executing at cloud management portal 208.

A local permissions system 206 (e.g., Active Directory, LDAP, Kerberos, vCenter, etc.) may be used to keep track of local accounts and identities, their roles, and the permissions they have been granted.

HCI cluster 202 may include a cryptographic lockbox for storing account credentials (e.g., username/password pairs) in order to enable administration tasks to be automated. A cryptographic lockbox is typically implemented as a file that has been encrypted using some cryptosystem. For example, an RSA lockbox uses Rivest-Shamir-Adleman encryption, and other types of lockbox may use other cryptosystems.

Some embodiments may also store a credential mapping in the cryptographic lockbox. In the example shown, local user identifier User1 corresponds to the cloud user identity that is associated with email address user1@example.com. Other local user identifiers may correspond to other cloud user identities.

In one embodiment, the local credentials that are stored in the lockbox may be anonymized (e.g., by replacing usernames with numeric identifiers, hashing the user names, or any other suitable anonymization scheme) and then transmitted to the RBAC service of cloud management portal 208.

This may allow the security model of local permissions system 206 to be extended to cloud features. HCI management system 204 may include a plugin that is operable to extend the local privilege model to include features that are implemented via cloud management portal 208.

Thus, for example, a customer may create and manage security permissions for local identities in HCI management system 204. The plugin may enable real-time synchronization of permissions with the cloud. For example, when a permission changes for a local identity such as User1 (e.g., by a new permission being granted, an existing permission being revoked, the identity being deleted entirely, etc.), HCI cluster 202 may receive information regarding the change from HCI management system 204 in real-time or near real-time. HCI cluster 202 may then look up the corresponding cloud identity (user1@example.com) in the lockbox, anonymize the change, and synchronize the permission change information with cloud management portal 208.

Later, when an administrator attempts to perform a management task that requires local access via a restricted page served by cloud management portal 208, the administrator may enter the credentials for the cloud identity user1@example.com. HCI cluster 202 may then in due course receive instructions corresponding to the management task from cloud management portal 208. Before executing such instructions, however, HCI cluster 202 may determine which local identity corresponds to that cloud identity by consulting the mapping in the lockbox. If that local identity has sufficient privileges to carry out the task, it may proceed. If not, an error may be raised and/or the task may fail.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   receive, from a cloud management portal, a request to execute a management task, wherein the request includes information regarding a cloud identity associated with the request, wherein the cloud identity is a cloud user identity in a context of the cloud management portal;
   determine a local identity that corresponds to the cloud identity, wherein the local identity is a local user identity in a context of the information handling system, and wherein determining the local identity that corresponds to the cloud identity comprises accessing a mapping between local identities and cloud identities, the mapping being stored in a cryptographic lockbox that is stored on a storage resource that is local to the information handling system;
   determine whether the local identity has sufficient privileges to execute the management task; and
   in response to a determination that the local identity does have sufficient privileges to execute the management task, cause the management task to be executed.

2. The information handling system of claim 1, wherein the cryptographic lockbox further comprises password information associated with the local identity.

3. The information handling system of claim 1, wherein the information handling system comprises a cluster of information handling systems.

4. The information handling system of claim 3, wherein the cluster is a hyper-converged infrastructure (HCI) cluster.

5. The information handling system of claim 4, wherein the management task includes a software and/or firmware upgrade associated with the HCI cluster.

6. A computer-implemented method comprising:
   an information handling system receiving, from a cloud management portal, a request to execute a management task, wherein the request includes information regarding a cloud identity associated with the request, wherein the cloud identity is a cloud user identity in a context of the cloud management portal;
   determining a local identity that corresponds to the cloud identity, wherein the local identity is a local user identity in a context of the information handling system, and wherein determining the local identity that corresponds to the cloud identity comprises accessing a mapping between local identities and cloud identities, the mapping being stored in a cryptographic lockbox that is stored on a storage resource that is local to the information handling system;
   determining whether the local identity has sufficient privileges to execute the management task; and
   in response to a determination that the local identity does have sufficient privileges to execute the management task, causing the management task to be executed.

7. The method of claim 6, wherein the cryptographic lockbox further comprises password information associated with the local identity.

8. The method of claim 6, wherein the information handling system comprises a cluster of information handling systems.

9. The method of claim 8, wherein the cluster is a hyper-converged infrastructure (HCI) cluster.

10. The method of claim 9, wherein the management task includes a software and/or firmware upgrade associated with the HCI cluster.

11. An article of manufacture comprising a non-transitory, computer-readable medium having computer-executable instructions thereon that are executable by a processor of an information handling system for:
- receiving, from a cloud management portal, a request to execute a management task, wherein the request includes information regarding a cloud identity associated with the request, wherein the cloud identity is a cloud user identity in a context of the cloud management portal;
- determining a local identity that corresponds to the cloud identity, wherein the local identity is a local user identity in a context of the information handling system, and wherein determining the local identity that corresponds to the cloud identity comprises accessing a mapping between local identities and cloud identities, the mapping being stored in a cryptographic lockbox that is stored on a storage resource that is local to the information handling system;
- determining whether the local identity has sufficient privileges to execute the management task; and
- in response to a determination that the local identity does have sufficient privileges to execute the management task, causing the management task to be executed.

12. The article of claim 11, wherein the cryptographic lockbox further comprises password information associated with the local identity.

13. The article of claim 11, wherein the information handling system comprises a cluster of information handling systems.

14. The article of claim 13, wherein the cluster is a hyper-converged infrastructure (HCI) cluster.

15. The article of claim 14, wherein the management task includes a software and/or firmware upgrade associated with the HCI cluster.

* * * * *